US008545301B2

(12) United States Patent
Shuster et al.

(10) Patent No.: US 8,545,301 B2
(45) Date of Patent: Oct. 1, 2013

(54) REMOTE CARD GAME WITH DUPLICATE HANDS

(76) Inventors: Gary Stephen Shuster, Fresno, CA (US); Brian Mark Shuster, Vancouver (CA)

( * ) Notice: Subject to any disclaimer, the term of this patent is extended or adjusted under 35 U.S.C. 154(b) by 1013 days.

(21) Appl. No.: 11/624,150

(22) Filed: Jan. 17, 2007

(65) Prior Publication Data

US 2008/0169605 A1 Jul. 17, 2008

(51) Int. Cl.
*A63F 13/00* (2006.01)

(52) U.S. Cl.
USPC ............................................. 463/11; 463/22

(58) Field of Classification Search
USPC .................. 463/22, 16–21, 11, 30–35, 40–42
See application file for complete search history.

(56) References Cited

U.S. PATENT DOCUMENTS 7,422,521 B2 * 9/2008 Peterson ........................... 463/9

OTHER PUBLICATIONS

Definition of "translate", Mirriam-Webster's Ninth Collegiate Dictionary, 1986.*
Duplicate Poker Rules; http://www.duplicatepoker.com/WebSite/epokerusa.aspx?page=dpg_rules, pp. 1-9.

* cited by examiner

*Primary Examiner* — Ronald Laneau
*Assistant Examiner* — Ross Williams
(74) *Attorney, Agent, or Firm* — Novak Druce Connolly Bove & Quigg LLP; Jonathan Jaech

(57) ABSTRACT

Duplicate hands are dealt in a remote game of poker or other card game of chance. Simulated cards or game pieces are dealt to players with the order of suits changed for each player. A map is maintained in a computer memory between a reference set of indices corresponding to card suits, and differently-ordered sets of playing suits for dealing in the game. A reference game is maintained at a server computer to track game status according to the reference set of indices. Game play is translated between the reference game and individual playing suits so that players are unaware of the order of suits used for other players.

19 Claims, 4 Drawing Sheets

REMOTE CARD GAME WITH DUPLICATE HANDS

BACKGROUND OF THE INVENTION

1. Field of the Invention

The present invention relates to games of chance, and more particularly to a game played using a computer to connect multiple remote players in a game of chance that simulates a card game.

2. Description of Related Art

Numerous card games are known in the art, which are played with multiple players in competition against one another. One or more decks of playing cards comprising a set of cards are shuffled and dealt to the players. Each player plays using the randomly selected portion of the deck or decks, i.e., the "hand," that she has been dealt. The outcome of such games is not determined by luck alone, but also involves an element of ski on the part of the players. For example, card games such as bridge, poker, pinochle, and other such games are generally recognized as involving both luck and skill in competitive game play.

With the widespread adoption of public computer networks, computer-implemented games have been developed to enable remotely-located players to participate in games of chance that simulate various card games. A computer-implemented engine is used to control game play such that each player receives a randomly-determined hand, thereby simulating a dealer dealing a physical card hand to a group of players. No player can see the hands dealt to the other players. Depending on the type of game being played, certain cards are shown to all of the players from the remaining set (e.g., deck or decks) of cards or from the players' hands. The game engine keeps track of the players' moves, keeps score of the game and determines winners and losers. The game engine may also receive or keep track of wagers made by the players, and may pay winnings by crediting player accounts. Such computer-implemented, remote card games have become a popular source of entertainment for many card players.

Notwithstanding the advantages of such games, they are subject to certain limitations. For example, it may be desirable to provide a computer-implemented game for card tournaments or the like, in which players can compete in ways that reduce or minimize the influence of luck on the tournament outcome, providing the most skillful players with greater opportunities for winning. At the same time, however, it is desirable to retain the essential character of traditional games using randomly-determined hands. It is desirable, therefore, to provide a new computer-implemented gaming method to provide new and interesting ways for player competition in such games, that overcomes the limitations of the prior art.

SUMMARY OF THE INVENTION

The present invention provides a method of game play that may be implemented using a computer to manage play for remotely-located players. The method may be used to enable players to compete with each other so as to increase the importance of the players' skill in determining the game outcome, without altering the essential character of popular card games based on randomly-determined hands. The method may be implemented to enable any desired plural number of players, and especially large numbers of players, to compete with one another in tournament fashion. The outcomes of multiple games may be related to determine tournament winners. All players may participate in the tournament at the same time, or at different times.

The game engine may be controlled to deal identical hands to different players participating in different games of the tournament. The extent to which identical hands are dealt may be controlled depending on the degree to which it is desired to level out the element of luck among the players. For example, it may be possible to operate a tournament in which every player experiences the same hands over the course of a tournament, albeit in a different sequence, and against different players. As all players are ultimately dealt the same hands, the most skilled players are more likely to win. In the alternative, tournaments may be arranged in which a pool of players is divided into groups. For example, a pool of a thousand players may be divided into one hundred groups of ten. Each group plays a round together, with different rounds playing simultaneously, or essentially simultaneously. Identical hands are dealt to players in different groups, who do not play directly with each other. The hands in each round are randomly determined. After numerous rounds of play, the player winning the most rounds is likely to be the most skilled, because numerous players receive identical cards in each round. For example, in a pool of thousand players divided into groups of ten players each, in each round ten groups of one hundred players each will receive identical cards. As used herein "randomly determined" or "randomly selected" includes quasi-random processes such as known in the computer arts to generate outcomes that appear to be random.

In games where players receive identical hands, it is important that players be prevented from discovering or recognizing hands held by other players. Games may be structured, as in the second example above, such that players do not receive hands that other players in the same group have received before. Therefore, a player will never face a hand that he has held before. However, players in other groups do receive identical hands. Particularly in remote game play, two or more players in different groups may share information about hands in a group, thereby gaining an unfair advantage over players that lack shared information. The invention provides a method and apparatus for reducing or eliminating illicit information sharing between players in such situations.

In an embodiment of the invention, therefore, a game engine comprises a module that randomly changes the order of suits dealt to the players, while keeping track of a master or reference suit in which the game is actually played. For example, a set of cards comprising four suits (clubs, spades, hearts and diamonds) may be simulated. In a reference game known only to the game engine, suit '1', suit '2', suit '3' and suit '4' are designated. The order of the suits has no significance in the game play. The game engine randomly selects one of the four named suits for playing to correspond with a reference suit for each player. A first player may receive cards and play a game in which suit '1' is clubs, suit '2' is spades, suit '3' is diamonds and suit '4' '1' is hearts. To a second player, the playing suit may be randomly selected such that suit '1' is hearts, suit '2' is diamonds, suit '3' is clubs and suit '4' is spades. In the same manner, randomly selected playing suits may be provided for any number of additional players. Each player sees the entire game unfold in the particular playing suit randomly selected for them, and the game engine translates between the playing suits to maintain an underlying base (reference) game.

Players therefore will find it much more difficult to share information about hands that have been dealt in a game. The suit randomization feature makes it impossible to determine the relationship between any of the randomly-selected playing suits and the suits in the reference game until a sufficient number of cards in different suits have been shown to all of the players. Even when it become theoretically possible to work out a translation map between playing suits from publicly known cards, the additional mental processing required to translate and make use of the information relatively late in a game may pose a difficult if not insurmountable barrier to cheating with illicit information.

A more complete understanding of the remote card game with duplicate hands will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
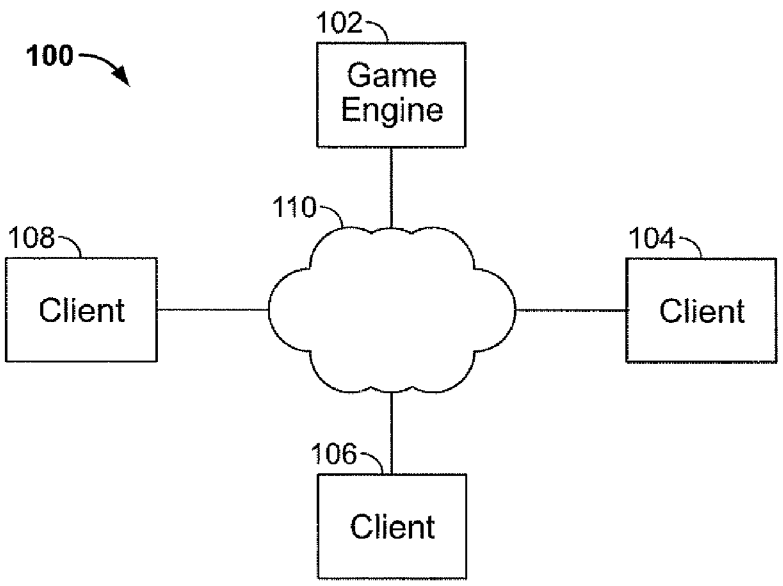
FIG. 1 is a diagram showing an exemplary system for playing a remote card game with duplicate hands.

Various systems for playing a remote simulated card game may be used with the invention. FIG. 1 shows an exemplary system 100. A computer-implemented game engine is in communication with a plurality of client devices 104, 106, 108 via a communications network 110. Methods of game play as disclosed herein may be implemented in software, firmware, or a combination of software and firmware in any suitable computing platform, using any suitable programming language and method as known in the art. Game engine 102 may be implemented using any number of computers or processors.

System 100 may comprise any number of client devices. Client devices may comprise, for example, personal computers, portable computers, palm computing devices, wireless communication devices, or the like, capable of communicating with client engine 102 via network 110. Network 110 may comprise a public wide area network, such as the Internet, or any other communications network. Communications in the network and with the client devices and game engine may comprise any suitable wired or wireless communication signals.

Figure 2:
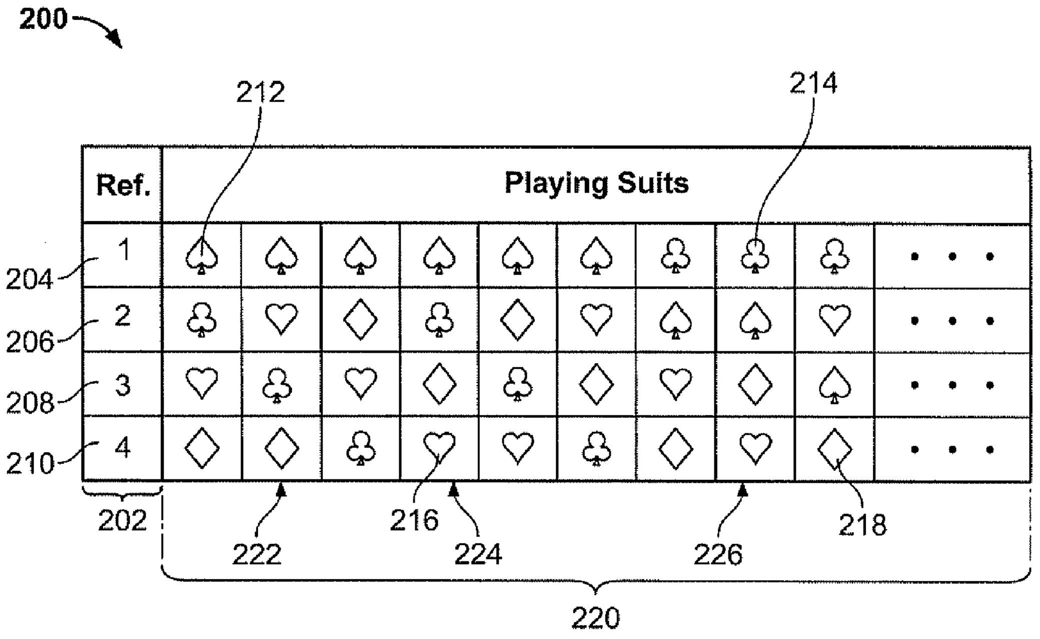
FIG. 2 is a table showing exemplary mapping between playing suits and a reference suit for a remote simulated card game.

Game engine 102 may maintain a map 200 between a reference suit 202 and a plurality of randomly-determined playing suits 220, as shown in FIG. 2. Map 200 may be maintained in any suitable memory operably associated with the game engine. Reference suit 202 comprises any number of arbitrary suits, for example, suit ‘1’ 204, suit ‘2’ 206, suit ‘3’ 208 and suit ‘4’ 210. It should be apparent that any identifier may be used to designate a reference suit. The number of reference suits may be selected to correspond to four suits in a traditional deck of playing cards, for example, spades 212, clubs 214, hearts 216 and diamonds 218. Map 200 may comprise any number of randomly ordered sets 220 each comprising one playing suit symbol, e.g., spade, club, heart and diamond.

The invention is not limited to remote simulation of traditional Western card games. It may be applied to any game or simulated game of cards, tiles, or other playing pieces in which pieces are assigned different values within defined types or suits. For example, the game of Mah Jongg may comprise seven suits, three suits comprising nine tiles each having values of 1-9 (e.g., bamboos, circles, and characters), three suits comprising four tiles each having values 1-4 or North, South, East, West (e.g., winds, seasons and flowers), and a dragon suit of three tiles. In this example, maps may be maintained between a reference set and six of the seven Man Jongg suits, with playing suits randomly selected within the two sets of three suits having equal numbers of tiles. Various other arrangements are used in Mah Jongg and other games. The invention is not limited to simulation of existing card, tile, or piece games, and may be applied to new games of the type described above, as well. As generally used herein, a “card” may include other playing pieces, for example, tiles; and in the context of a simulated electronic game, a “card” refers to information representing a card or other playing piece, and not a physical object.

Map 200 maps a one-to-one correspondence between symbols of any particular playing suit and symbols of a reference suit and, conversely, one-to-many correspondence between each symbol of the reference suit and symbols of the various different playing suits. Each playing suit column of the table designates a playing suit that may be used in connection with one or more players for a simulated card game. For example, in playing suit 222, spades 212 are mapped to suit ‘1’ 204, hearts are mapped to suit ‘2’ 206, clubs are mapped to suit ‘3’ 208, and diamonds are mapped to suit ‘4’ 210. For the indicated one-to-one mapping between corresponding four-symbol sets, twenty-four unique ordered sets are possible, nine of which are shown in map 200.

Each playing suit may be maintained in a memory and randomly selected by a selection module. For example, any one of twenty-four possible ordered sets may be selected using a quasi-random number generator in a selection routine, and assigned for use with particular players and particular games. In the alternative, randomly ordered sets may be created for each new player and game, using a similar routine. Preferably, a different playing suit is selected or created in a random for each new player and game. Less preferably, once it has been assigned, a playing suit may be retained by the player to whom it is assigned for some duration of time or for some number of games greater than one.

Figure 3:
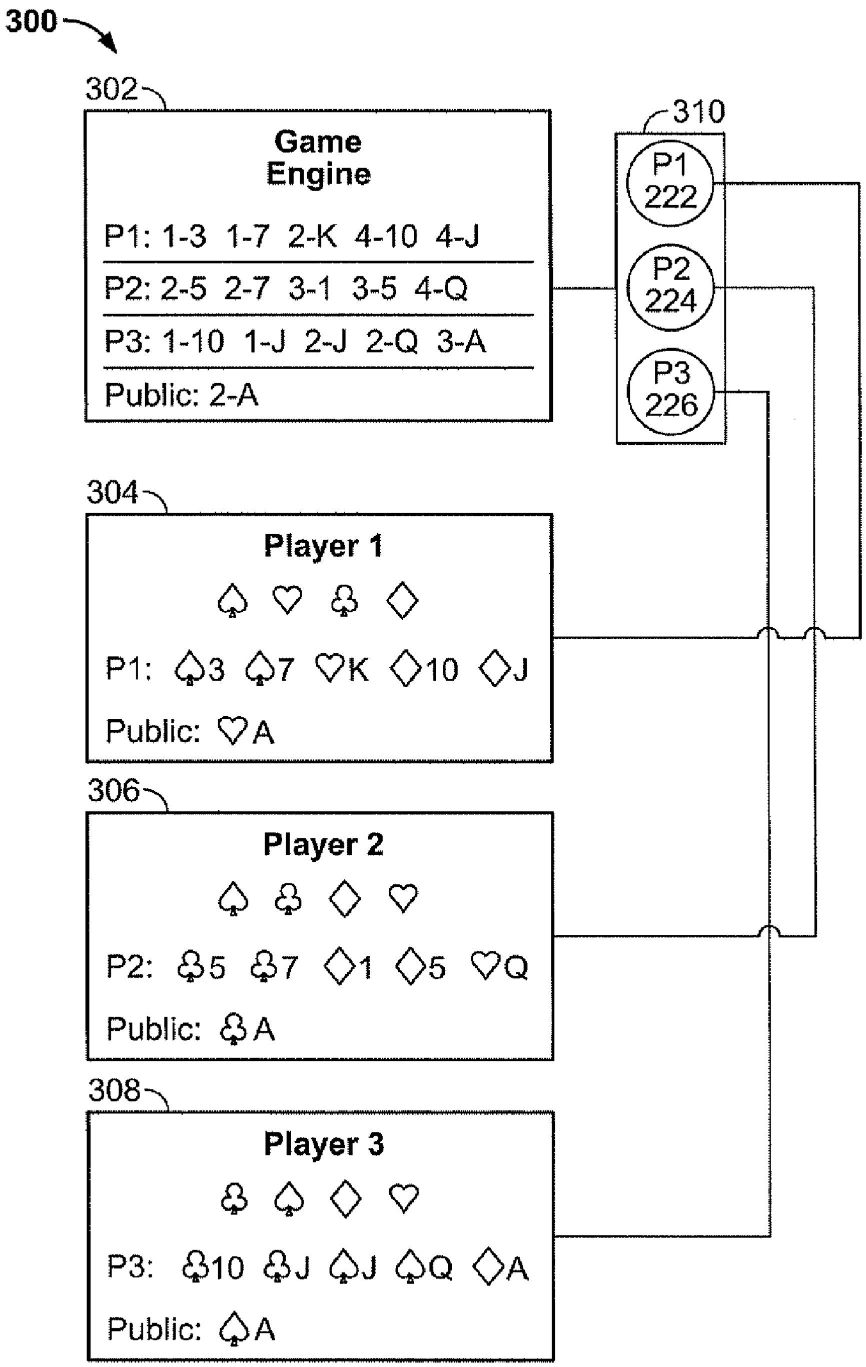
FIG. 3 is a state diagram showing an exemplary state of a game engine and player client devices during play of a remote simulated card game.

FIG. 3 shows an exemplary memory state 300 of a game engine during play of a simulated card games with remote clients. It should be apparent that any plural number of clients may be involved in a game, and the invention is especially useful for, although not limited to, games involving more players than a traditional card game can accommodate. For example, a simulated card game according to the invention may be played with tens, hundreds, or even thousands of players, either simultaneously or at different times. Each game may be played according to a defined set of rules such as traditionally govern card play or that may be newly defined. For example, each game may comprise a specific variation of poker, such as “5-Card Stud, “Texas Hold’Em,” or any other desired variation.

Memory state 300 is indicated schematically as being comprised of different blocks: a game engine block 302, player blocks 304, 306, and 308, and a translation block 310. A separate player block should be provided for each player.

Blocks are defined by the function and access privileges, and are not limited to any particular configuration of physical memory. The game engine block 302 maintains the reference game and is accessible at the game engine level only; i.e., is not directly accessible by the players. The translation block maintains the map between the reference game and the playing suits, and is also not directly accessible to the players. Each player may view and interact only with her own memory block 304, 306 or 308.

At an exemplary point during game play, game engine block 302 may hold player hands P1, P2 and P2, and one or more public cards. In the illustrated example, the public card has the value "Suit 1-Ace." Player One (P1) has five cards: "Suit 1-3," "Suit 1-7," "Suit 2-King." "Suit 4-10," and "Suit 4-J." Other randomly or quasi-randomly selected hands are shown for Player Two (P2) and Player Three (P3), the values of which should be apparent from FIG. 3.

Translation block 310 maintains maps between each player's playing suit and the reference suit. For example, Player One may be assigned a first playing suit 222 as shown in FIG. 2. Likewise, Player Two may be assigned the playing suit 224 and Player Three may be assigned suit 226. Any other or additional playing suits may he mapped in translation block 310.

Thus, referring again to FIG. 3, block 304 holds Player One's hand and the public card mapped to playing suit 222. Player One sees that she holds a Three of Spades, a Seven of Spades, a King of Hearts, a Ten of Diamonds and a Jack of Diamonds. She sees the public card as an Ace of Hearts. Player Two, interfacing with the game via block 306, sees the public card as the Ace of Clubs and sees her own hand mapped to playing suit 224. Player Three sees the public card as an Ace of Spades and sees his own hand mapped to playing suit 226. Each player plays the entire game in his or her own mapped suit, and remains unaware of other players' mappings. If, for example, Player Two reveals her hand (which to Player Two appears as the Five of Clubs, Seven of Clubs, One of Diamonds, Five of Diamonds and Queen of Hearts), these values are mapped through the translation block 310 such that Player One sees the Five of Hearts, Seven of Hearts, One of Clubs, Five of Clubs and the Queen of Diamonds. In the same way, Player Three sees Player Two's hand if revealed to him as the Five of Spades, Seven of Spades, One of Diamonds, Five of Diamonds and the Queen of Hearts.

Figure 4:
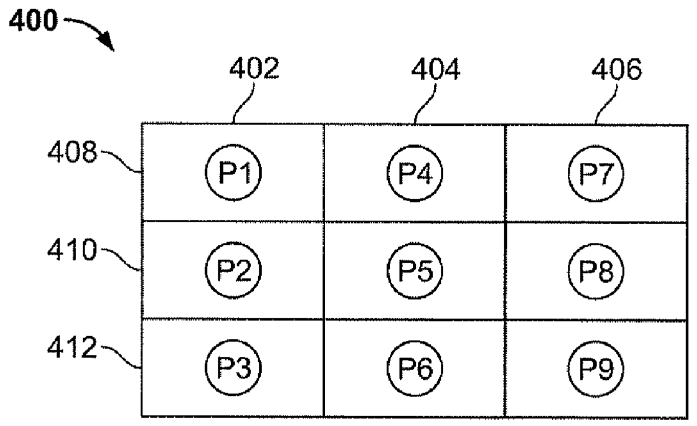
FIG. 4 is a diagram showing an exemplary duplicate game distribution for a remote simulated card game.

FIG. 4 shows an exemplary arrangement for a game 400 using duplicate hands. The suit mapping method disclosed herein should be used to prevent unwanted or illicit disclosures between players. An exemplary group of nine players P1-P9 is illustrated, although it should be apparent that any plural number of players may be grouped in a corresponding fashion. Players P1, P2 and P3 are grouped in a first game 402. Players P4, P5 and P6 are grouped in a second game 404. Players P7, P8, and P9 are grouped in a third game 406. Any number of corresponding games may be played. Games 402, 404, and 406 may be played at the same time, or nearly so, and include at least a portion of players receiving hands identical to players in other games. Public cards may also be identical, but to prevent decoding of suit mapping, public cards determined by the game engine may, in the alternative, be different in different games. In the alternative, or in addition, the games may be played at different times. Players P1-P9 are remotely located and interact via a game engine as described herein. The game engine should not provide for any communication between players in different games concerning the state of game play.

Players P1-P9 are further grouped as receiving identical hands. For example, Players P1, P4, and P7 in row 408 may receive identical hands, but each player receives a different player suit transformation, which conceals the fact that the reference hands are identical. Likewise, Players P2, P5 and P8 in row 410 may receive identical hands, as may Players P3, P6 and P9 in row 412. In an embodiment of the invention, one or more "horizontal" group of players does not receive identical hands, but rather randomly selected hands from the remaining set of undealt cards so as to prevent complete identity between games and make it more difficult for collaborating players in different groups to benefit from sharing information. In the alternative, all of the players may receive identical hands, so that games 402, 404, and 406 are completely identical, except for different suit mapping. Even so, when each game involves a large number of players, the chances that a relatively small number of conspiring players will be able to gain useful information is greatly reduced by different suit mapping across games. If public cards provided by the dealer (game engine), for example the "flop" cards in Texas Hold'Em, are not identical in different games, the benefit of information sharing may be further reduced.

Whatever the details of the game and the extent to which different games in the set are identical, the arrangement of play shown in FIG. 4 should benefit players who wish to compete in a test of playing skill, with a reduced element of luck. When multiple games are played in this fashion, over the course of many games the most talented players should emerge as winners.

Figure 5:
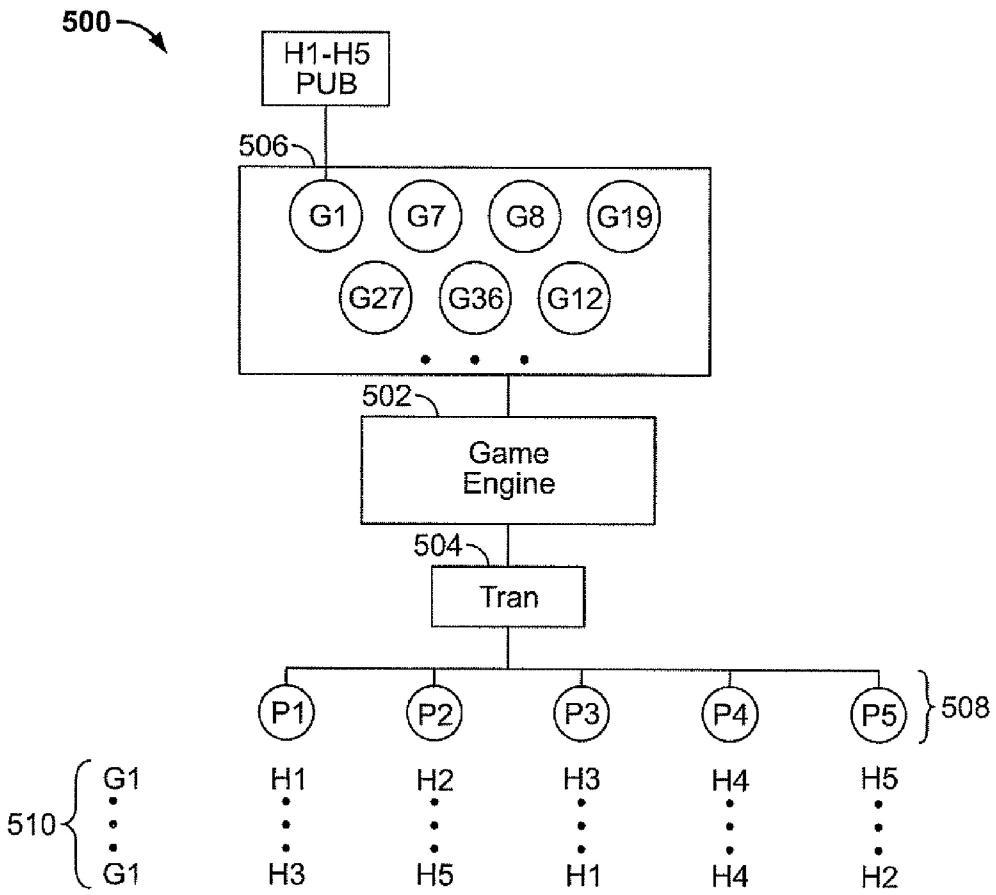
FIG. 5 is a diagram showing an exemplary duplicate game distribution for a remote simulated card game, according to an alternative embodiment.

FIG. 5 shows an alternative arrangement 500 in which identical games are played in a randomly selected order. A plurality of games, arbitrarily designated G1, G7, G8, G19, G27, G36 and G12 are maintained in a memory block 506 operably associated with a game engine 502. Each game comprises a reference set of hands for a designated number of players, for example, five players P1-P5 in the illustrated example. System 500 may be adapted for any plural number of players and any plural number of games. As described above, the retained games may be completely defined so as always to result in the same distribution of cards, or may include one or more hands or public cards that are selected differently in different instances of game play.

Game engine interfaces with players 508 via a translation module 504, providing separate suit transformations to each player P1-P5 as described herein. Preferably, suit transformations are changed between every game. A series of games 510 are played. At intervals, the length of which may be randomly determined, the same game is provided to the players, but different players receive different hands. For example, game GI may be played in which player P1 receives hand H1, player P2 receives hand H2, and so forth. Some number of games later, the same group of players P1-P5 may receive the same game G1, but this time each player receives a different hand, or randomly receives the same hand as before. That is, hands are selected in a new process that either guarantees a different distribution of hands using a non-random rotation, or is likely to result in a different distribution using a separate random selection. The second time, player P1 receives hand H3 (or any other different or randomly selected hand), player P2 receives hand H5, and so forth as indicated in FIG. 5. A particular game may be played any number of times. With a sufficient number of intervening games and different suit transformations between identical games, most or all players will not perceive that the same game is being played by the group.

Figure 6:
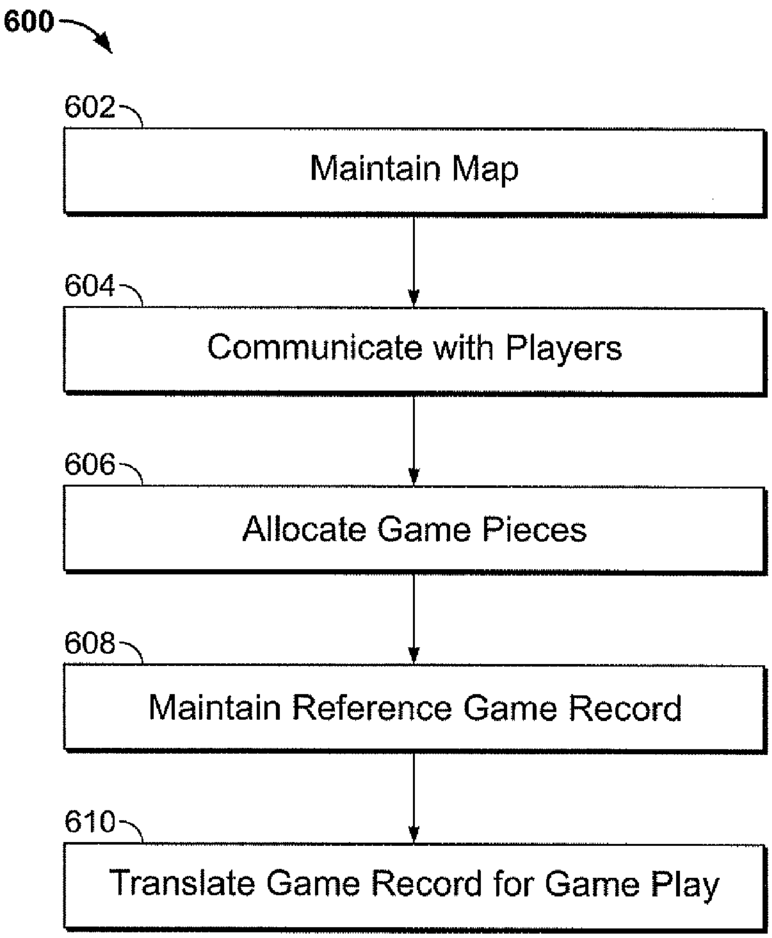
FIG. 6 is a flow chart showing a method for managing a plurality of card games.

According to the foregoing, therefore, a method 600 of managing a plurality of card games is defined as exemplified by FIG. 6. The method may be applied in a computer-implemented system for playing a game of chance using a set of simulated game pieces associated with game symbols separable into subsets characterized by common types. For example, the game pieces may comprise playing cards for poker or other traditional card games.

Method 600 may comprise a step 602 of maintaining a map in a memory operatively associated with a computer, wherein the map defines one-to-many relationships between each type of a reference set of game symbol types and each type of a plurality of different playing sets of game symbol types. The simulated game pieces used in the method may represent a set (deck or decks) of playing cards, with the game symbol types correspond to suits in the set. The computer may randomly select, for each of the plurality of players, the different ones of the plurality of playing sets. The computer may comprise a single processor or computer, or a plurality of processors or computers in communication with one another.

At concurrent step 604, a computer in communication with the memory in which the map is maintained may communicate with the plurality of players to manage a game according to defined rules, such as rules for poker or other games. Optionally, the computer may communicate with the players, at least some of whom may be remotely located, via a wide area network. The computer may serve a player interface to each player, or in the alternative, may communicate with an interface operating on remote clients, or some combination of the foregoing. The computer may receive inputs from the plurality of players indicative of game play moves.

At step 606, the computer randomly allocates simulated game pieces to the plurality of players according to rules of the game of chance, e.g., deals simulated cards for poker. The allocating step should comprise allocating duplicate sets of simulated game pieces to different ones of the plurality of players. As described in more detail above, the duplicate sets may be allocated at substantially the same time to the different ones of the plurality of players playing in separate player groups. In the alternative, or in addition, the duplicate sets may be allocated at substantially different times to the different ones of the plurality of players. These alternatives are further described by FIGS. 4 and 5, respectively, and the accompanying discussion.

At step 608, the computer maintains a reference game record of simulated game pieces during play of the game of chance. The reference game record comprises information associating simulated game pieces according to the reference set with each of the plurality of players, as shown by the examples herein. The computer may update the reference game record in response to the player inputs indicative of game play moves.

At step 610, the computer translates at least a portion of the reference game record using the map to provide different ones of the plurality of players with information about allocated game pieces, using corresponding different ones of the plurality of different playing sets. For example, separate poker games may be maintained by translating from the reference game. As noted above, each player should receive information about her hand only in her designated playing set of symbol. All players should be prevented from access to the reference game record or the map, to prevent cheating that might occur by collaborating players in different ones of the separate games.

The foregoing disclosure exemplifies only two possible systems or methods for distribution of identical games to a player pool, as diagrammed by FIGS. 4 and 5. One of ordinary skill may develop variations on these systems or methods based on the disclosure herein. The invention may be applied to a wide variety of card and similar games to provide new and interesting methods of managing play, while facilitating fairer competition and discouraging cheating. The invention is defined by the following claims.

What is claimed is:

1. In a computer-implemented system for playing a game of chance using a set of simulated game pieces associated with game symbols separable into subsets characterized by common types, a method for managing game play comprising:

maintaining a map in a memory operatively associated with a computer, wherein the map defines one-to-many relationships between each type of a reference set of game symbol types and each type of a plurality of different playing sets of game symbol types;

randomly allocating simulated game pieces to a plurality of players according to rules of a game of chance, using the computer;

maintaining a reference game record of simulated game pieces in the memory during play of the game of chance using the computer, wherein the reference game record comprises information associating simulated game pieces according to the reference set with each of the plurality of players; and translating between each type of a reference set of game symbol types and each type of a plurality of different playing sets of game symbol types according to the map using the computer to provide, during play of the game, information describing each respective player's allocated game pieces expressed only in corresponding different ones of the plurality of different playing sets of game symbol types.

2. The method of claim 1, wherein the simulated game pieces used in the method represent a pack of playing cards, and the game symbol types correspond to suits of a deck of playing cards.

3. The method of claim 1, further comprising preventing the plurality of players from having access to the reference game record.

4. The method of claim 1, further comprising receiving inputs from the plurality of players indicative of game play moves.

5. The method of claim 4, further comprising updating the reference game record in response to the inputs.

6. The method of claim 1, further comprising randomly selecting, for each of the plurality of players, the different ones of the plurality of playing sets translated in the translating step.

7. The method of claim 1, wherein the allocating step further comprises allocating duplicate sets of simulated game pieces to different ones of the plurality of players.

8. The method of claim 7, wherein the duplicate sets are allocated at substantially the same time to the different ones of the plurality of players playing in separate player groups.

9. The method of claim 7, wherein the duplicate sets are allocated at substantially different times to the different ones of the plurality of players.

10. A computer-implemented method for managing a plurality of poker games, comprising:

communicating via a computer network with a plurality of players to manage a plurality of poker games;

randomly allocating simulated hands of cards to the plurality of players in a computer memory using a computer operatively connected to the computer network, wherein the simulated hands of cards comprise corresponding hands of cards each mapped to a single reference hand maintained in a memory of the computer and having different suits assigned to cards having equal value in the corresponding hands, each of the simulated hands being allocated to respective ones of players engaged in separate ones of the poker games;

determining a game result in each of the separate poker games, using the computer maintaining a map in the computer memory, wherein the map defines one-to-many relationships between an ordered reference set of indices corresponding to suits of a set of simulated playing cards and a plurality of differently-ordered sets of suits;

maintaining a reference game record of simulated cards during play of the poker game, wherein the reference game record comprises information associating simulated cards according to the reference set with each of the plurality of players; and translating between each type of a reference set of game symbol types and each type of a plurality of different playing sets of game symbol types using the map to provide different ones of the plurality of players with information about allocated cards appearing in corresponding different ones of the plurality of differently-ordered sets of suits.

11. The method of claim 10, wherein the allocating step further comprises allocating the hands such that a plurality of different player groups are allocated the same hands of playing cards at substantially the same time.

12. The method of claim 11, further comprising ranking players based on comparative results achieved by players allocated the same hand across different groups.

13. The method of claim 12, further comprising ranking players based on an aggregate of the comparative results across multiple different games.

14. The method of claim 10, wherein the allocating step further comprises allocating the hands such that at least one player group is allocated corresponding hands of playing cards at substantially different times, the corresponding hands being distributed to different players of the group at the different times.

15. The method of claim 14, further comprising ranking players based on an aggregate of comparative results achieved by players allocated corresponding hands across multiple different games.

16. The method of claim 10, further comprising preventing the plurality of players from having access to the reference game record.

17. The method of claim 10, further comprising receiving inputs from the plurality of players indicative of game play moves.

18. The method of claim 17, further comprising updating the reference game record in response to the inputs.

19. A computer-implemented method for managing a plurality of poker games, comprising:

randomly allocating simulated hands of cards to a plurality of players in a computer memory according to rules of a poker game, using a computer, maintaining a map in the computer memory using the computer, wherein the map defines one-to-many relationships between an ordered reference set of indices corresponding to suits of playing cards and a plurality of differently-ordered sets of playing suits;

maintaining a reference game record of simulated cards during play of the poker game in the computer memory using the computer, wherein the reference game record comprises information associating simulated cards according to the reference set with each of the plurality of players; and translating between each type of a reference set of game symbol types and each type of a plurality of different playing sets of game symbol types according to the map using the computer to provide respective different ones of the plurality of players with translated information about allocated cards, the translated information expressing each respective player's hand using corresponding different ones of the plurality of differently-ordered sets of playing suits.

* * * * *